United States Patent [19]

Herre et al.

[11] Patent Number: 5,455,833
[45] Date of Patent: Oct. 3, 1995

[54] PROCESS FOR THE DETECTING OF ERRORS IN THE TRANSMISSION OF FREQUENCY-CODED DIGITAL SIGNALS

[75] Inventors: Jürgen Herre; Dieter Seitzer, both of Erlangen, Germany

[73] Assignee: Fraunhofer Gesellschaft zur Forschung e.V., Germany

[21] Appl. No.: 39,478

[22] PCT Filed: Oct. 25, 1990

[86] PCT No.: PCT/DE91/00832

§ 371 Date: Apr. 26, 1993

§ 102(e) Date: Apr. 26, 1993

[87] PCT Pub. No.: WO92/08296

PCT Pub. Date: May 14, 1992

[30] Foreign Application Priority Data

Oct. 25, 1990 [DE] Germany ............... 40 34 017.1

[51] Int. Cl.⁶ ................ G10L 3/00; G10L 5/00
[52] U.S. Cl. ........................ 371/31; 381/46
[58] Field of Search ................ 371/31; 381/46, 381/31, 73.1, 94, 47

[56] References Cited

U.S. PATENT DOCUMENTS

| | | | |
|---|---|---|---|
| 4,245,248 | 6/1981 | Netravali et al. | 358/136 |
| 4,656,514 | 4/1987 | Wilkinson et al. | 358/160 |
| 4,907,277 | 3/1990 | Callens et al. | 381/46 |

OTHER PUBLICATIONS

Robert Mitchell ("Channel Error Recovery for Transform Image Coding", IEEE, vol. COM 29, No. 12, Dec. 1981).

*Primary Examiner*—Roy N. Envall, Jr.
*Assistant Examiner*—Emmanuel Moise
*Attorney, Agent, or Firm*—Antonelli, Terry, Stout & Kraus

[57] ABSTRACT

Disclosed is a process for the detection of errors, respectively perceptible disturbances, in the transmission of frequency-coded digital signals and, in particular, audio signals transmitted in blocks by a transmitter to a receiver.

The present invention is distinguished by that from the frequency coefficients of earlier and, if need be, future blocks, a decision function is formed, on the basis of which the occurrence of an error is determined, and that the frequency coefficient containing an error is not longer utilized for the evaluation of subsequent blocks.

9 Claims, 1 Drawing Sheet

PROCESS FOR THE DETECTING OF ERRORS IN THE TRANSMISSION OF FREQUENCY-CODED DIGITAL SIGNALS

TECHNICAL FIELD

The present invention relates to a process for the detection of errors, respectively perceptible disturbances, in the transmission of frequency-coded digital signals and, in particular, audio signals transmitted in blocks by a transmitter to a receiver.

STATE OF THE ART

Processes in which, by way of illustration, audio signals are transmitted frequency-coded are general state of the art. PCT publications WO 88/001811 and WO 89/08357 are cited, only by way of example. Moreover, explicitly these publications are to be referred to with regard to the explanation of any terms not made more apparent herein.

The processes described in these publications utilize a suited imaging technique, such as filter banks, fast Fourier transformation (FFT), DCT, MDCT, etc., for coding signals and, in particular, audio signals digitally with respect to frequency.

If the transmission of the data is faulty, i.e. if individual or several consecutive frequency coefficients contain an error due to disturbances, disturbances will occur in the receiver following "inverse transformation in this period", in the case of audio signals manifested by blubbering, gurgling, etc.

SUMMARY OF THE INVENTION

The object of the present invention is to provide a process for the detection of errors, i.e. of perceptible disturbances, by a transmission of frequency-coded digital signals and, in particular, audio signals transmitted in blocks by a transmitter to a receiver, which operates in a simple manner and yet is subjectively relatively free of disturbances.

A solution to this object according to the present invention is set forth in claim 1 hereto. Further improvements to the present invention are the subject of the subclaims.

An element of the present invention is that from the frequency coefficients of earlier and, if need be, future blocks, a decision function is formed, on the basis of which it is determined whether or not an error occurred during the transmission. The term "error" means that a decision is made by comparing earlier and, if need be, future frequency coeffients whether or not a perceptible, i.e. by way of illustration, in the case of audio signals an audible disturbance is occurring following inverse transformation. If it is determined that a frequency coefficient contains an error, i.e. leads to a perceptible disturbance, it will not be utilized for the evaluation of subsequent blocks.

According to claim 2, other frequency coefficients may also be employed for the decision function. In particular, they may be frequency coefficients having a lower ordinal number, i.e. belonging to lower frequencies, than the frequency coefficients of the checked frequency coefficient (claim 3).

Furthermore, according to claim 4, it is preferable if only frequency coefficients of earlier blocks are used for the decision function. This obviates relatively time-consuming intermediate storage of the transmitted frequency coefficients in the receiver.

According to claims 5 and 6, functions F(i,k) formed by taking maximum value, averaging or other linear combinations of coefficients of adjacent blocks may be employed as decision functions.

According to claim 5, a symmetrical frequency interval which, on the one hand, permits particularly good error detection but in which, on the other hand, "unchecked higher" frequency coefficients are utilized is employed.

In any event, the invented process permits certain detection of errors, i.e. of perceptible distubances, without requiring the transmission of supplementary information in addition to the transmission of frequency coefficients. As correction occurs with utilization of temporally and/or frequency adjacent transformed values, the invented process can be applied in all types of imaging technology and independent of any specific internal set-up of the transmission system. It may, by way of illustration, be used in the detection of audible disturbances, by way of illustration, in the transmission of digital radio broadcasting in which a "data reduction process" is employed or also in the reproduction of signals stored as "unreduced" frequency coefficients.

Above all, the invented process does not only permit the detection of an error but also its correction. For this purpose the frequency coefficient containing an error is replaced by an approximation value formed from the frequency coefficient which was detected to be error-free and, if need be, from the corrected values of the frequency coeffcents which were previously detected to be containing an error as well as from the current not yet evaluated frequency coefficients of this block and the adjacent blocks (claims 7 to 9).

The foregoing and other objects, advantages, manner of operation, novel features and a better understanding of the present invention will become apparent from the following detailed description of a preferred embodiment and claims when read in connection with the accompanying drawings, all forming a part of the disclosure hereof this invention. While the foregoing and following written and illustrated disclosure focuses on disclosing an embodiment of the invention which is considered a preferred embodiment at the time the patent application was filed in order to teach one skilled in the art to make and use the invention, and to otherwise satisfy the best mode disclosure requirements under U.S. patent law, it should be clearly understood that the same is by way of illustration and example only and is not to be taken by way of limitation, the spirit and scope of the present invention being limited only by the terms of the appended claims.

DESCRIPTION OF A PREFERRED EMBODIMENT

Figure 1:
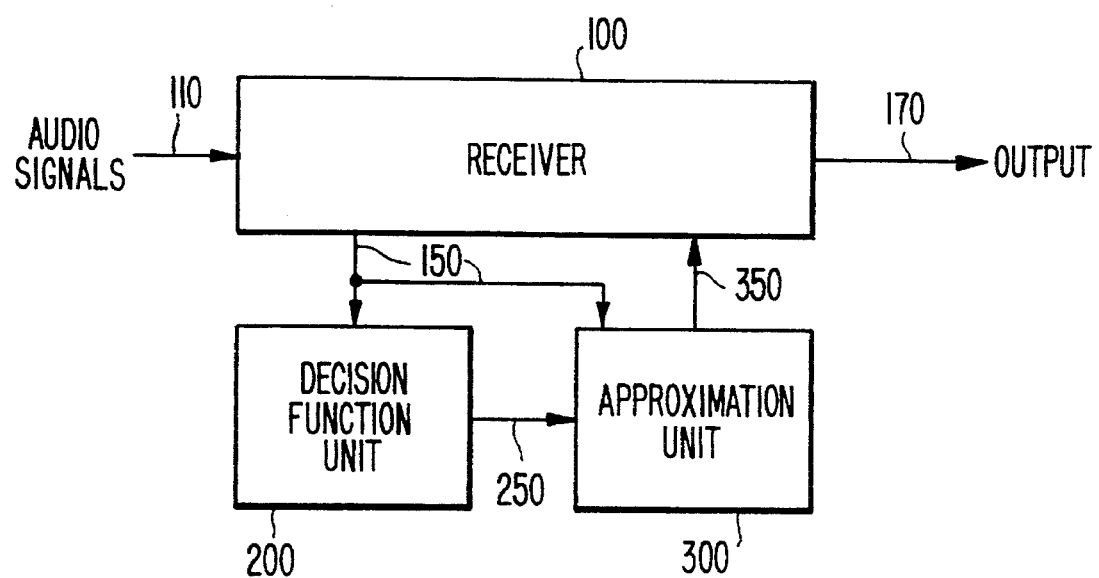

FIG. 1 is a block diagram illustrating a preferred embodiment of the invention, wherein: a receiver 100 receives audio signals 110, a decision function unit 200 receives information 150, e.g., frequency coefficients, from the receiver 100 and performs a decision function (described ahead), and approximation unit 300 receives information 150, e.g., frequency coefficients, from the receiver 100 and further information 250, e.g., detected error information, from the decision function unit 200. The approximation unit 300 performs an approximation function (description ahead) and outputs information 350, e.g., approximation values, to the receiver 100. Output signals 170, e.g., corrected audio signals, are output from the receiver 100.

As already explained, in the invented process, the received values, respectively values reconstructed in blocks, occurring in the receiver are observed in the frequency range prior to being inversely transformed in this period. The values of several earlier blocks and possibly blocks to be reconstructed in the future are stored: the values of blocks to be reconstructed in the future are at disposal for reconstruction due to a respective delay. The processing may be carried out, in particular, by an, as such known, digital signal processor which, if need be, works with pipelining and has the respective storage means or delay means.

In the following exemplary description, $x(i,k)$ stands for the i-th frequency coefficient of the k-th block. A decision function $F(i,k)$ $$F(i,k)=f(x(i-d1..i+d2, k-d3..k+d4)$$

is formed from the frequency coefficients $(x(i,k)$. This decision function is utilized to decide whether the frequency coefficient $(x(i,k)$ is presumed faulty, i.e. leading to a perceptible disturbance, with a perceptible disturbance meaning a disturbance leading to in the case of video signals a visible image disturbance or in the case of audio signals to an audible audio disturbance.

By way of illustration, in a transmission system working with a MDCT transformation, the ordinal numbers d1=d2=4, d3=2 and d4=0 may be selected, i.e. an analysis is made of four adjacent frequency lines each of the current block and of the two preceding blocks.

The following function $F(i,k)$ $$F(i,k)=x(i,k)>.5* Max(x(m,n))$$

may, by way of illustration be used as the decision function, with $x(i,k)$, respectively $(x(m,n)$ i-th, respectively m-th frequency coefficient of the k-th respectively n-th block and i–4 m i+4 and k–2 n k.

Of course, other suited functions $F(i,k)$ formed, by way of illustration, by averaging or other linear combinations of coefficients of adjacent blocks may also be employed as decision functions. These functions may utilize symmetrical frequency intervals or only frequency coefficients "lying in the past".

If a frequency coefficient is detected to be containing an error by means of the selected decision function. The value of an estimation function $$G(i,k)=g(x(i-h1..i+h2, k-h3..k+h4)$$

is substituted for the frequency coefficient $x(i,k)$.

In the case of a MDCT transformation, the following values may be selected:

h1=d1
h2=d2
h3=d3
h4=d4

The following function may be used as the estimate, respectively, the approximation function:

$$G(i,k)=sign(x(i,k))*Max(x(m,n))$$

with $x(i,k)$, respectively $x(m,n)$ i-th, respectively m-th frequency coefficient of the k-th, respectively n-th block, and i–4 m i+4 and k–2 n k
and i<>m and k<>m.

The above estimation function is, of course, only an example. Other estimation functions can be employed depending on the application.

In the afore-illustrated example, error detection and correction occurs without utilization of the frequency coefficients x (i,k) which lie in the future so that no delay, respectively no storage of output signals, i.e. transmitted frequency coefficients, is required.

Furthermore, the corrected value is not utilized for the assessment of other values and is thus deleted in the storage means.

The present invention has been described in the preceding using an example; naturally many very different modifications of the present invention are possible.

Thus criteria from an analysis of transmitted channel data can be utilized for an analysis whether a value is faulty or not, such as, by way of illustration, sums of digits. Furthermore, error conditions can be derived from the decoding of error-correcting codes, etc.

The choice of the parameters d1 . . . 4, h1 . . . 4 and the decision and estimation function F, respectively G, provided by way of example depend on the imaging technique employed, on the permissible delay time, on the storage capacity required and on the magnitude of the expected disturbance.

In any event, however, the two-dimensional analysis of the transformed values in frequency and time reduces to a minimum the adulteration of the signal due to errors. The process suppresses singly occurring, psycho-acoustically peculiar disturbance peaks. A sudden rise in the signal level, however, is not interpreted as an error due to the analysis of frequency adjacent values.

What is claimed is:

1. A process for detection of errors, respectively perceptible disturbances in a transmission of frequency-coded digital signals, in particular, of audio signals which are transmitted in blocks by a transmitter to a receiver, characterized in that from frequency coefficients of earlier and, if need be, subsequent blocks, a decision function is formed, on the basis of which the occurrence of an error in a checked block is determined, and further in that a frequency coefficient detected to be containing an error is no longer utilized for evaluation of subsequent blocks.

2. A process according to claim 1, characterized in that other frequency coefficients of the checked block are also utilized for forming said decision function.

3. A process according to claims 1 or 2, characterized in that only frequency coefficients of lower frequencies than a checked coefficient are utilized for forming said decision function.

4. A process according to claims 1 or 2, characterized in that only frequency coefficients of earlier blocks are utilized for forming said decision function.

5. A process according to claim 1, characterized in that a function $F(i,k)$ is utilized as said decision function $$F(i,k)=|x(i,k)|>.5*max(|x(m,n)|)$$

wherein $x(i,k)$ and $x(m,n)$, respectively, represent an i-th and m-th frequency coefficient of a k-th and n-th block, respectively, and wherein $i-4 \leq m \leq i+4$ and $k-2 \leq n \leq k$.

6. A process according to claim 1, characterized in that a function $F(i,k)$ formed by averaging or other linear combinations of coefficients of adjacent blocks is employed as said decision function.

7. A process according to claim 1, characterized in that a frequency coefficient detected to be containing an error by said decision function is substitued by an approximation value formed from frequency coefficients, which were detected to be error-free, and corrected values of the frequency coefficients, which were previously detected to be containing an error, of the checked block and adjacent blocks.

8. A process according to claim 7, characterized in that only frequency coefficients detected to be error-free are utilized for forming said approximation value.

9. A process according to claim 7 or 8, characterized in that a function $G(i,k)$ is utilized as said approximation function $$G(i,k) = \text{sign}(x(i,k)) * max(|x(m,n)|)$$

wherein $x(i,k)$ and $x(m,n)$, respectively, represent an i-th and m-th frequency coefficient of a k-th and n-th block, respectively, and wherein $i-4 \leq m \leq i+4$, $k-2 \leq n \leq k$, $i \neq m$ and $k \neq n$.

* * * * *